US010659366B1

(12) United States Patent
Mehr

(10) Patent No.: US 10,659,366 B1
(45) Date of Patent: May 19, 2020

(54) LOAD BALANCER METADATA FORWARDING ON SECURE CONNECTIONS

(71) Applicant: Amazon Technologies, Inc., Seattle, WA (US)

(72) Inventor: Nima Sharifi Mehr, Vancouver (CA)

(73) Assignee: Amazon Technologies, Inc., Seattle, WA (US)

( * ) Notice: Subject to any disclaimer, the term of this patent is extended or adjusted under 35 U.S.C. 154(b) by 33 days.

(21) Appl. No.: 14/932,577

(22) Filed: Nov. 4, 2015

(51) Int. Cl.
*H04L 12/803* (2013.01)
*H04L 29/06* (2006.01)

(52) U.S. Cl.
CPC .......... *H04L 47/125* (2013.01); *H04L 63/166* (2013.01)

(58) Field of Classification Search
CPC ............................ H04L 47/125; H04L 63/166
See application file for complete search history.

(56) References Cited

U.S. PATENT DOCUMENTS

| | | | |
|---|---|---|---|
| 7,567,504 B2 | 7/2009 | Darling et al. | |
| 7,865,596 B2 | 1/2011 | Grosner et al. | |
| 8,799,641 B1 | 8/2014 | Seidenberg et al. | |
| 9,549,152 B1 | 1/2017 | Nayyar et al. | |
| 2002/0143798 A1 | 10/2002 | Lisiecki et al. | |
| 2002/0194211 A1 | 12/2002 | Subramanian et al. | |
| 2003/0149746 A1 | 8/2003 | Baldwin et al. | |
| 2004/0133631 A1 | 7/2004 | Hagen et al. | |
| 2006/0167891 A1 | 7/2006 | Blaisdell et al. | |
| 2007/0016782 A1* | 1/2007 | Crall | H04L 63/0823 713/175 |
| 2007/0283024 A1* | 12/2007 | Landrum | H04L 67/28 709/228 |
| 2009/0070457 A1 | 3/2009 | McKinney | |
| 2012/0254443 A1 | 10/2012 | Ueda | |
| 2013/0031424 A1 | 1/2013 | Srivastava et al. | |
| 2014/0064056 A1 | 3/2014 | Sakata et al. | |
| 2014/0304413 A1 | 10/2014 | Kondamuru et al. | |
| 2015/0032691 A1 | 1/2015 | Hall et al. | |
| 2015/0249512 A1 | 9/2015 | Adimatyam et al. | |
| 2015/0288590 A1 | 10/2015 | Mason et al. | |
| 2016/0330230 A1* | 11/2016 | Reddy | H04L 63/1433 |
| 2017/0018645 A1 | 1/2017 | Maeda et al. | |
| 2017/0086024 A1 | 3/2017 | Do | |

FOREIGN PATENT DOCUMENTS

WO 2015095463 6/2015

OTHER PUBLICATIONS

U.S. Appl. No. 14/932,580, filed Nov. 4, 2015, Nima Sharifi Mehr.

* cited by examiner

*Primary Examiner* — Ajit Patel
*Assistant Examiner* — Wilfred Thomas
(74) *Attorney, Agent, or Firm* — Robert C. Kowert; Kowert, Hood, Munyon, Rankin & Goetzel, P.C.

(57) ABSTRACT

Network devices, such as load balancers may be configured to forward client metadata to back-end nodes using defined fields of a security protocol. For example, client metadata may be inserted into an extension field or certificate defined by a security protocol that is used for a secure connection between the load balancer and the back-end node. In some instances, a source IP address based on a received request may be inserted into the extension field or certificate defined by the security protocol before the request is forwarded to the back-end node. The back-end node may extract the client metadata and use the client metadata for any of a number of processes (e.g., billing, tracking, security, logging, etc.).

17 Claims, 14 Drawing Sheets

LOAD BALANCER METADATA FORWARDING ON SECURE CONNECTIONS

BACKGROUND

As the scale and scope of network-based applications and networked-based services such as cloud computing have increased, data centers may house hundreds and thousands of host devices (e.g., web servers) that need to be load balanced. Some network host devices such as load balancers generally receive incoming traffic to a network and distribute or route it to other network devices (e.g., to services deployed on multiple hosts). Conventional load balancers typically use techniques such as max connections, round robin, and/or least connections applied to data collected from the host devices to select which host device will handle a connection. In addition, load balancers may serve as proxies to the host devices they front and thus terminate connections (e.g., Transmission Control Protocol (TCP) connections) from client and send client traffic to host devices on connections established between the host devices and the load balancer. Thus, a host (e.g., a back-end device or process) and a client do not necessarily communicate over a direct connection when using load balancers.

In some instances, network devices may need to forward extra information along with the original request to the other network devices. Some mechanisms for forwarding the extra information lack robustness. For example, forwarding mechanisms that rely upon parsing the application request may fail and skip adding the metadata. In another example, forwarding mechanisms that rely upon integration efforts (e.g., code to strip out metadata from TCP payload) may not always be reliable.

Further, while health probes (e.g., TCP or HTTP pings) may be used to identify hosts which are not able to process any requests, some probes (e.g., a TCP ping) may not be reliable for detecting some or all application level issues, while other probes (e.g., application or service level probes such as HTTP pings) may not be comprehensive enough to cover some potential failure paths. In other words, a health pin may only indicate that a host is available, not information about the host's load. Therefore, solely depending on these probes to establish the health status of hosts may error prone and unreliable.

Figure 1:
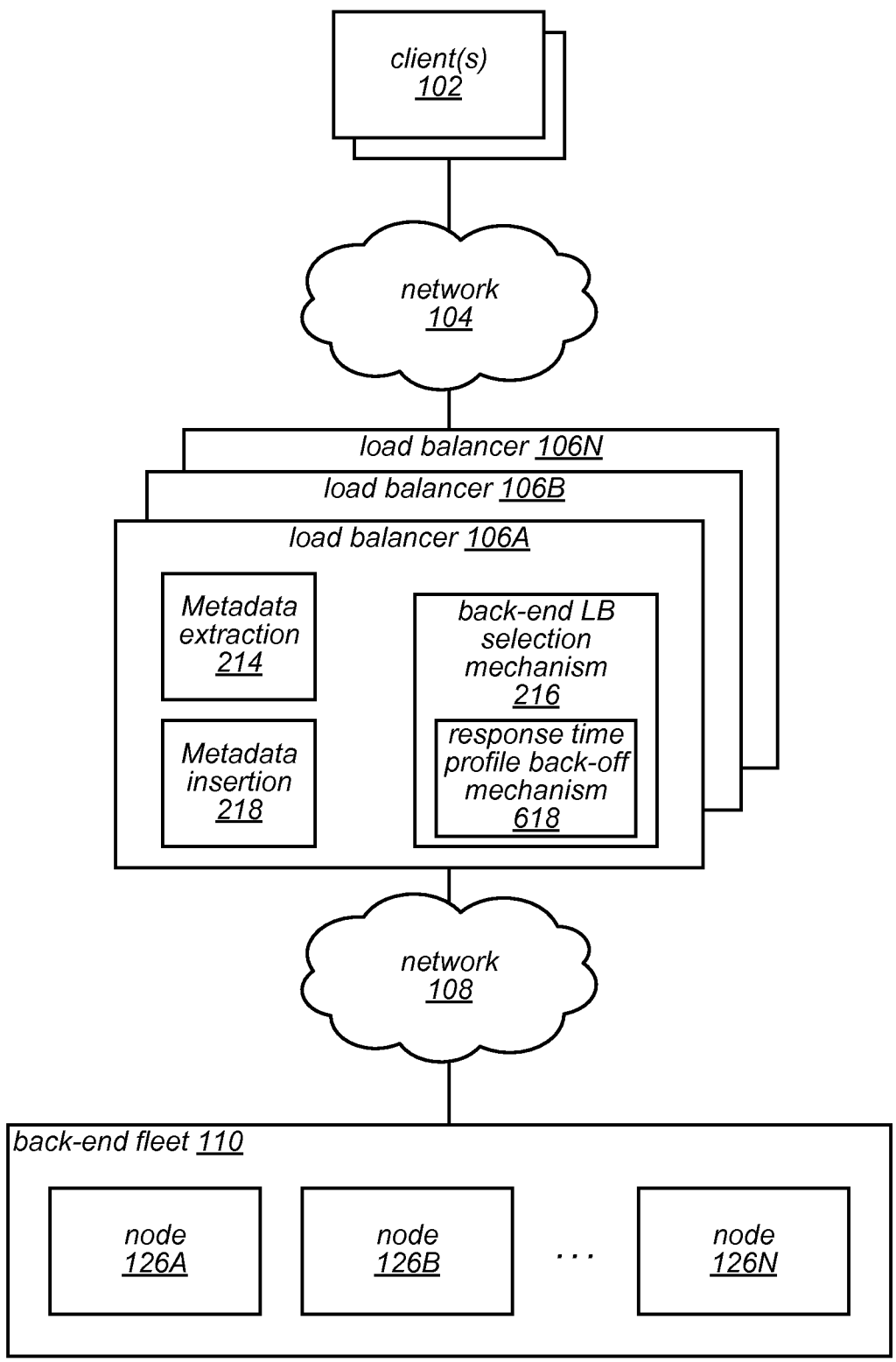
FIG. 1 illustrates an example service provider environment in which a load balancer fleet and a back-end fleet operate, according to at least some embodiments.

While embodiments are described herein by way of example for several embodiments and illustrative drawings, those skilled in the art will recognize that embodiments are not limited to the embodiments or drawings described. It should be understood, that the drawings and detailed description thereto are not intended to limit embodiments to the particular form disclosed, but on the contrary, the intention is to cover all modifications, equivalents and alternatives falling within the spirit and scope as defined by the appended claims. The headings used herein are for organizational purposes only and are not meant to be used to limit the scope of the description or the claims. As used throughout this application, the word "may" is used in a permissive sense (i.e., meaning having the potential to), rather than the mandatory sense (i.e., meaning must). Similarly, the words "include," "including," and "includes" mean including, but not limited to.

DETAILED DESCRIPTION

Various embodiments of methods and apparatus provide a network device that forwards metadata using an otherwise unused feature of a security protocol. In some instances, network devices (e.g., load balancers) may need to forward extra information to other devices or services of a system. For example, a load balancer of a service provider may need to forward a source IP address of a message received by the service provider system to a service or other network device of the service provider network.

In some systems, metadata of a message sender may need to be forwarded. For example, layer seven (the application layer of the *Open Systems Interconnection Basic Reference Model*, described in ISO/IEC 7498-1, the entirety of which is hereby incorporated by reference) load balancers may forward metadata via features of application layer protocols, such as injecting HTTP headers. In another example, layer four (transport layer) load balancers may use proprietary solutions, such as embedding metadata in front of the original TCP payload.

However, some solutions may suffer from a lack of robustness (e.g., if a layer seven load balancer fails to parse the application request, it may skip adding the metadata and fall back to forwarding requests in layer three mode). The layer three mode may also suffer from lack of robustness. For instance, to forward metadata, a layer three load balancer may require integration (e.g., code to strip out metadata from TCP payloads) any may not be reliable for use with binary protocols (e.g., magic numbers used for specifying the presence of metadata might conflict with read data content).

Embodiments of the system, devices and processes described herein may forward metadata using an otherwise unused feature of the system (e.g., a feature of a security protocol). For example, a load balancer may use a security feature (e.g., a transport layer security extension or certificate) to forward metadata. In some instances, a load balancer that uses a transport layer security channel for communication with other network devices or services (e.g., back-end services of a service provider) may use a security features of the transport layer security protocol to forward metadata. The feature used for forwarding the metadata may be ignored by back-end services without any negative impact, in embodiments. In some embodiments, using the security feature to forward metadata may eliminate the risk of conflict with the content of the message as it may use a standard way (an established extension or certificate) to transfer data within the forwarded message. In some embodiments, using such a mechanism may have the advantage of not requesting parsing of the request at the application layer (parsing at the application layer can be error prone or otherwise unreliable) in embodiments.

Additionally, embodiments of the system, devices and processes described herein may provide a load balancing algorithm that reduces the request loads to hosts (e.g., back-end nodes or processes running on the back-end nodes) which are responding to requests faster than expected or historically observed. As described above, health probes may not reliably detect application-level issues or some potential failure paths; depending solely on such probes to establish health status of hosts may be error prone and unreliable. Furthermore, there are load balancing algorithms that route more requests to hosts that are responding faster than other hosts.

Sometimes (e.g., when a host is failing to process requests and immediately returns application-level errors—those errors not identifiable by load balancers) the host appears to respond more quickly than the other hosts and may be prioritized over the other hosts to receive more requests. As explained below with regard to FIGS. 9A and 9B, such request routing behavior can cause a spike in failed requests and an increased impact of host malfunction.

In various embodiments described herein (e.g., FIGS. 6-9B), a load balancing algorithm may be implemented that reduces the request load to hosts that are responding to requests faster than expected or historically observed. For example, the load balancer may keep a performance profile of hosts and compare a historical performance metric from the profile with the hosts' more recent (e.g., some recent time window) performance. For response times that are shorter than expected, the load balancer may reduce the load on the host (e.g., reduce the number of requests or messages sent to that host), in embodiments. The load balancer may be configured such that request routing may go back to the routing that was performed prior to the reduction, when the host begins performing in accordance with the known performance profile for that host.

Also disclosed is a health-check ping mechanism that simulates host unavailability to a load balancer. Various strategies may be employed by load balancers to decide on how to distribute the requests among hosts. A simple strategy is round robin where available hosts are chosen sequentially for receiving the request. More sophisticated strategies exist in which the load balancers consider the resources available (e.g., CPU, memory, etc.) on the hosts for routing new requests to them. However, these more sophisticated strategies are not available on all load balancers. Adding them might not be a trivial option where closed third-party hardware/software is used, for example.

Using load balancers with only a simple strategy like a round robin request distribution strategy may pose greater outage risks. For example, considering a case where one request is causing a host to consume 90% CPU, all other requests directed to this host may end up being processed more slowly than expected and therefore might cause timeouts on the client-side. These timeouts may translate to retry requests and browning out the hosts. This situation may be caused by load balancers that rely on simple health-checks or pings to decide if a host is ready to accept traffics. Such a situation highlights that it may be useful to simulate resource-aware load balancing (where the load balancer is made aware of the health of the resource) without making any change to the load balancers (e.g., those load balancers that rely on more simple strategies such as round robin).

In embodiments, a resource-aware ping response is implemented for network services on the back-end (behind the load balancers). In the implementation of service pings (e.g., an http ping), the service may first measure its required resource (e.g., CPU, memory, hard disk, etc.) availability. For calculated amounts of resources that fall below a configured threshold, the service may emit a ping response which simulates that the host is unavailable (e.g., by terminating the connection). Otherwise, the service may emit a ping response which represents that the host is available (e.g., return an HTTP 200 response). In embodiments, such a service design may allow the host to flip its status (from the load balancer point of view) between available and unavailable when the hosts' required resources become scarce.

In some embodiments, various combinations of the metadata extraction and insertion process, the load balancing algorithm that reduces the request loads to hosts which are responding to requests faster than expected or historically observed, and the resource-aware ping response may be implemented by various combinations of the disclosed components. For example, load balancer 106 and/or back-end node 126A may be configured with components that perform some combination of the steps from some or all of the illustrated processes herein.

FIG. 1 illustrates an example service provider environment in which a load balancer fleet and a back-end fleet operate in response to messages from clients 102, according to at least some embodiments. Generally, the processes described herein (e.g., illustrated in FIGS. 3, 4, 7, 12 and 13) may be implemented by one or more of the components described herein (e.g., illustrated in FIGS. 2, 5A/B, 6, 10 and 11). The components may be implemented via program instructions (e.g., one or more software modules) that are executable by one or more processors to perform the process. In some embodiments, the components of FIGS. 2, 5A/B, 6, 10 and 111 may be arranged within an environment similar to the environment illustrated in FIG. 1. Generally, it is contemplated that the depicted components may be arranged differently from the particular illustrated embodiments, that other components (not necessarily illustrated herein) may perform one or more of the steps described herein, and that at least some of the steps may be performed in a different order or not at all, without departing from the scope of the invention. Although some embodiments include processes and components within a service provider network that provides one or more services (e.g., a storage service, or a compute service) to numerous distinct customers, each customer including a distinct network of one or more clients, processes and components described herein may also be configured within an enterprise network to service messages from clients within the enterprise network, in some embodiments.

The environment illustrated in FIG. 1 depicts one or more clients 102 that are connected by a network 104 to a load balancer fleet 106. The depicted one or more clients 102 may include any of various client compute nodes (e.g., client computer devices, virtual clients, etc.) that send messages to the depicted load balancer fleet 106 (e.g., load balancers 106A-106N). The depicted network 104 may include any of various known networks (e.g., WAN, LAN, Internet, etc.) in a number of configurations (e.g., multiple networks, private networks, public networks). The depicted load balancer fleet 106 may be implemented as a number of load balancers for an entity such as an enterprise or as a number of load balancers operated by a service provider that provides services to a number of customers of the service provider, in embodiments. Network 108 may include any of various known networks (e.g., WAN, LAN, Internet, etc.) in a number of configurations (e.g., multiple networks, private networks, public networks). In some embodiments, network 108 may include an internal network of an enterprise or service provider.

FIG. 1 illustrates back-end fleet 110 with back-end nodes 126A-126N. A back-end node may include or be a host, in some embodiments. Generally, a host may run one or more back-end processes. The back-end fleet 110 may be connected via any of various networking devices or components including but not limited to switches, routers, and cables. In embodiments, nodes 126A-N may include virtual compute nodes implemented by one or more servers. The nodes 126A-N may be implemented by any of various resource stacks operating on underlying server hardware. Other configurations are also contemplated. The nodes 126 may be configured to provide various types of services (e.g., storage or compute services). In some embodiments, the services may implemented by one or more back-end processes (described below with regard to FIG. 2) that run on the nodes 126.

FIG. 1 illustrates an embodiment with load balancer 106A configured with metadata extraction module 214 and metadata insertion module 218. These and other modules of one or more load balancers (e.g., 106A-N) may be configured to perform functionality associated with forwarding client metadata to nodes of the back-end fleet 110. Additional embodiments of forwarding client metadata are described in regard to FIG. 2, described below.

FIG. 1 illustrates an embodiment with load balancer 106A configured with back-end selection mechanism 216 and response time back-off mechanism 618. These and other modules of one or more load balancers (e.g., 106A-N) may be configured to perform functionality associated with a response time back-off technique that, in embodiments, simulates to a load balancer that a host is unavailable as described in regard to FIG. 6, described below. The components and functionality associated with forwarding client metadata and the response time back-off technique may be practiced together, or individually, in embodiments. Some of the functionality associated with forwarding the client metadata and/or the response time back-off technique may be performed by services or providers external to the load balancer (e.g., an authentication service may provide metadata or the load balancer may obtain metrics from a monitoring service or system).

Forwarding Client Metadata

Figure 2:
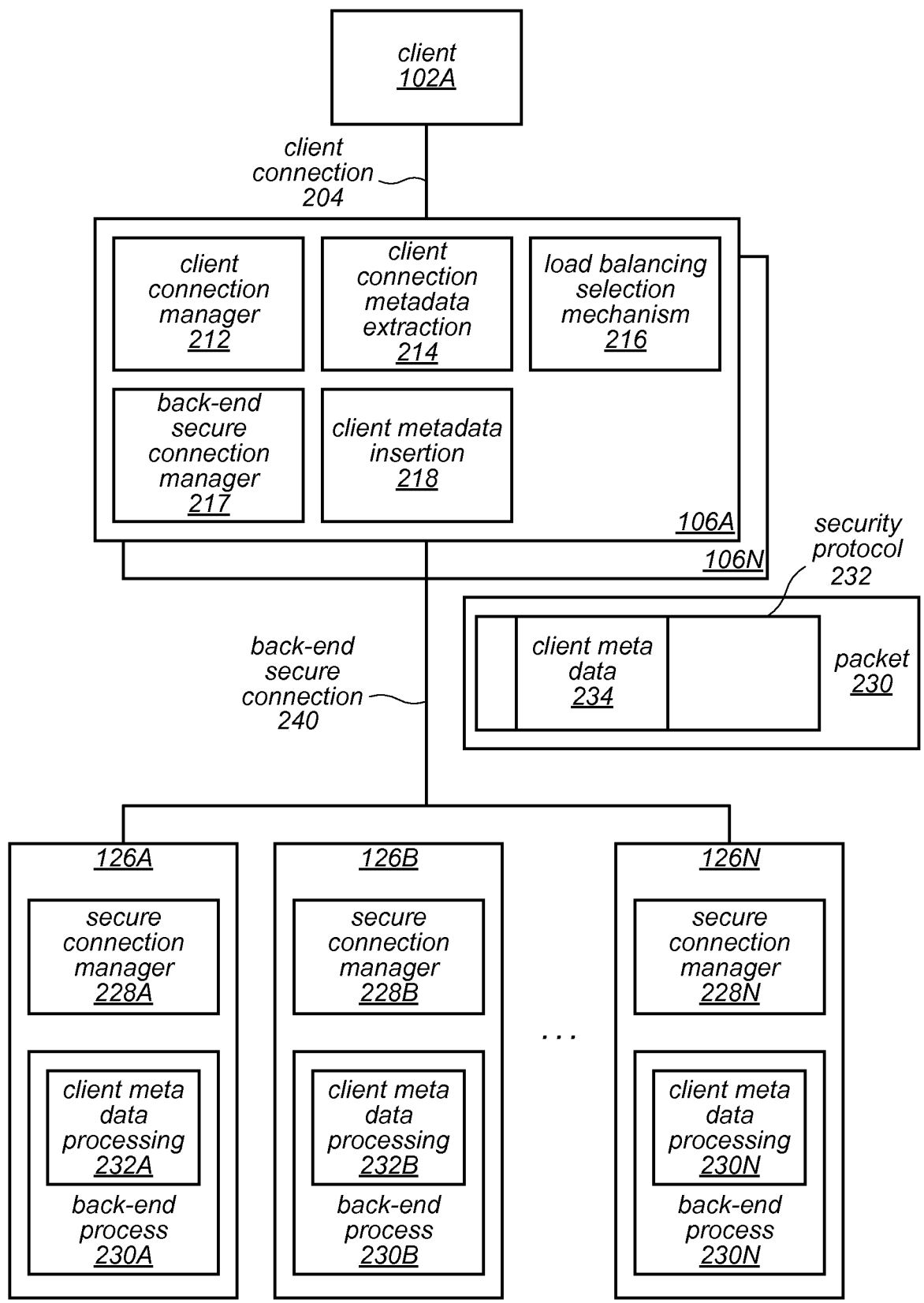
FIG. 2 illustrates components of a load balancer, packet, and back-end node, according to at least some embodiments.

FIG. 2 illustrates components of a load balancer, packet, and back-end node, according to at least some embodiments. Generally, a client 102 establishes a client connection 204 (e.g., a TCP connection over network 104) with load balancer 106A. The load balancer 106A terminates the client connection and establishes a secure back-end connection 240 (e.g., over network 108) to a back-end process (e.g., back-end process 230A of node 126A) and forwards a message received from the client 102 to the back-end process.

In some instances, it may be desirable to include metadata in the communications over the secure backend connection 240. For example, client metadata 234 (e.g., a source IP address from the corresponding client connection 204) may be included in a packet 230 that is transmitted over the back-end secure connection 240 to a back-end process. In some instances, the metadata may be included in a field or certificate of a security protocol 232 (e.g., SSL, TLS, etc.). In some embodiments, the metadata (client metadata or other data) may be included in a defined field of some standard (e.g., some standard that is not necessarily a security protocol).

Figure 3:
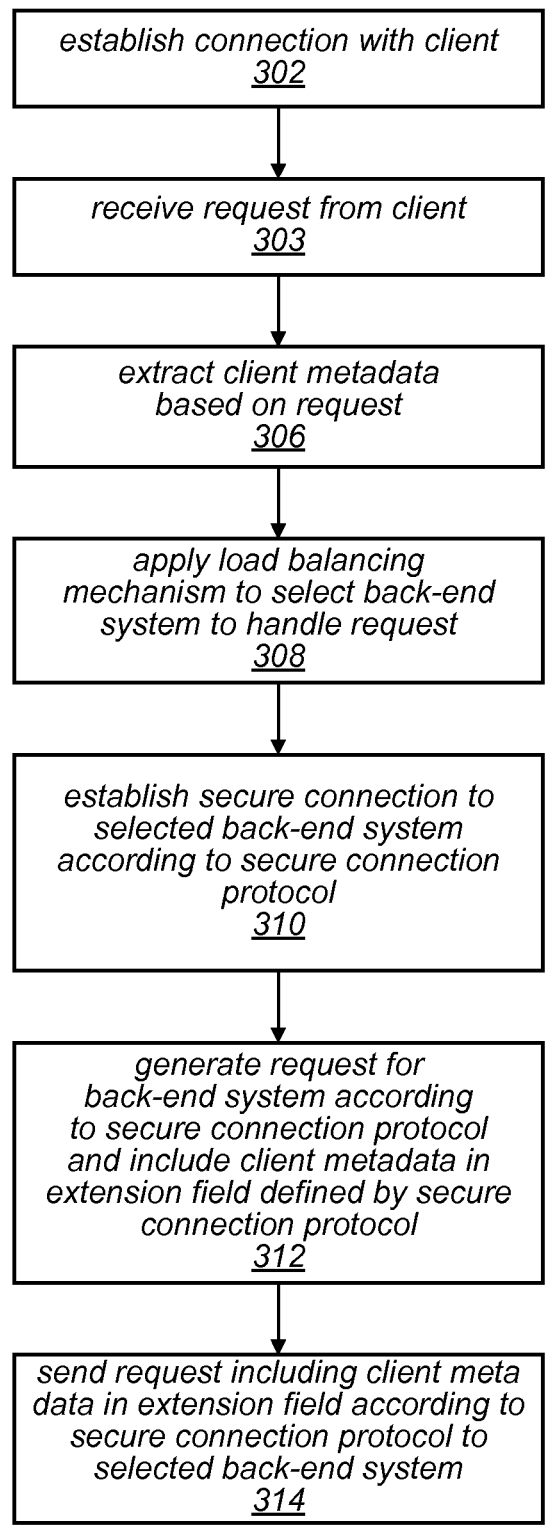
FIG. 3 illustrates a metadata forwarding process implemented by a network device, such as a load balancer, according to at least some embodiments.
Figure 4:
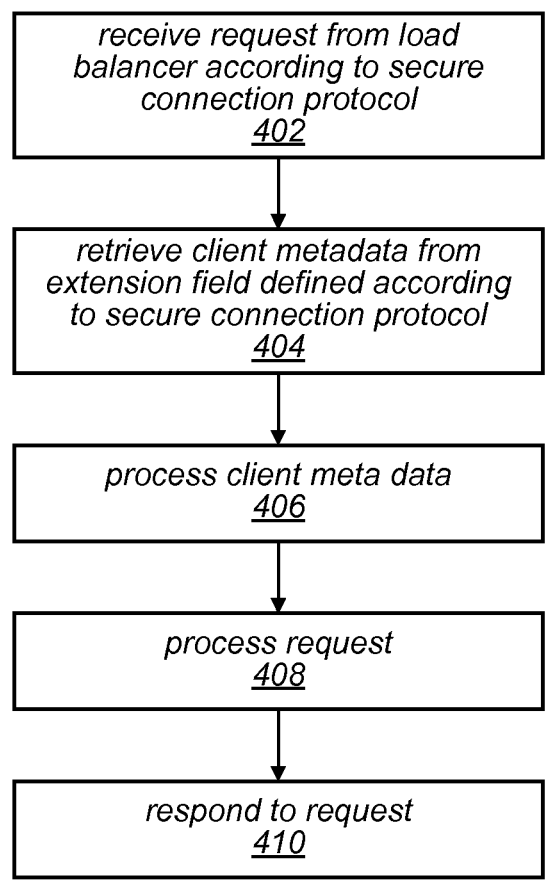
FIG. 4 illustrates a process for receiving forwarded metadata by a network device, according to at least some embodiments.

Load balancer 106A-N, and nodes 126A-126N are illustrated with a number of various components. Generally, in the illustrated embodiment, the components of load balancer 106A perform one or more of the steps of the process illustrated in FIG. 3 and the components of nodes 126A-N perform one or more of the steps of the process illustrated in FIG. 4, although the illustrated functionality may be performed by other components. For example, FIG. 3 illustrates a metadata forwarding process implemented by a network device, such as a load balancer, according to at least some embodiments. FIG. 4 illustrates a process for receiving the forwarded metadata by a network device, according to at least some embodiments. In some embodiment, the client metadata forwarding mechanism may be implemented without the use of magic bits or numbers. The illustrated process begins by establishing a connection with the client (block 302), and a request is received over the connection (block 303).

Generally, a load balancer terminates a connection with a client and creates a separate connection to the back-end. For instance, in the illustrated embodiment, a client connection 204 (e.g., a TCP connection) is established between client 102 and load balancer 106A. For example, client 102 may make a request for a TCP connection and client connection manager 212 of the load balancer 106A may reject or accept the connection. Load balancer 106A receives a request from the client 102 over the client connection 204.

Client metadata may be extracted based on the request. For example, client connection metadata extraction component 214 may extract metadata (e.g., a source IP address of the request or other metadata) based on the received request. In some instances, the client connection metadata extraction component 214 may extract a source IP address from one of the packets received from client 102.

In embodiments, a service distinct from the load balancer (e.g., an extractions service provided by a service provider or some third-party extraction service provider) may extract the metadata. In some instances, an authentication service (e.g., a certificate verification service) may extract metadata. Some such services may provide a token based on the metadata (e.g., instead of providing the metadata directly) to the load balancer for insertion, in embodiments.

FIG. 3 illustrates that a load balancing mechanism may be applied to select a back-end system (or service) to handle the request (block 308). For example, the load balancing selection mechanism 216 may apply one of any various a load balancing mechanism including, but not limited to, techniques such as max connections, round robin, and/or least connections. These and other techniques may be applied to data collected from the host devices and/or back-end processes that run on the host devices to select which host device or back-end process will handle a connection, in embodiments.

At block 310, a secure connection is established to select a back-end system according to a secure connection protocol. For instance, back-end secure connection manager 217 may establish a back-end secure connection 240 with a node (e.g., node 126A of the back-end fleet 110. As depicted in the illustrated embodiment, a secure connection manager of a back-end node (e.g., secure connection manager 228A of node 126A) may interact with a connection manager of a load balancer (e.g., back-end secure connection manager 217) to establish back-end secure connection 240.

A request may be generated for the back-end system according to a secure connection protocol, and the generated request may include the extracted client metadata in an extension field defined by that secure connection protocol (block 312). For instance, FIG. 2 depicts client metadata insertion module 218 that may include program instructions that generate the request for the back-end system. In some embodiments, the metadata may be included in a certificate used by the security protocol. Client metadata insertion module 218 may generate the request based on a packet structure or certificate structure defined by a secure connection protocol (e.g., SSL, TLS or some other security protocol) and insert the metadata into an otherwise unused field defined by the security protocol.

As illustrated at block 314, a request including the client metadata in the extension according to the secure connection protocol may be sent to the back-end system or service. For instance, the back-end secure connection manager 217 may send the generated request packet 230 over secure connection 240 to node 126A according to a secure connection protocol.

As illustrated at block 402, the request is received from the load balancer according to the secure connection protocol. For instance, back-end node 126A may receive the request in accordance with a secure connection protocol that is implemented by secure connection manager 228A of the back-end node 126A. The client metadata is retrieved from the extension field (or certificate) defined according to the secure connection protocol (block 404). In some embodiments, the client metadata may be retrieved by client metadata processing module 232A in accordance with the same security protocol implemented by secure manager 228A. For instance, client metadata processing module 232A may request that secure connection manager 228A extract the metadata from the received extension field or certificate defined by the security protocol and the secure connection manager 228A may provide the requested metadata to the client metadata processing module 232A of back-end process 230A.

The client metadata may be processed (block 406) and the request may be processed (block 408). For example, the client metadata processing module 232A may process the metadata (e.g., as a security measure, as a logging process, as a tracking process, as a billing process, as a way to enforce priority service levels, as a way to enforce a security list such as a white or blacklist, etc.) and the back-end process 230A may process the request. The back-end process 230A may respond to the request (block 410). For instance, the back-end process (e.g., a storage or compute-based process) may perform some computation based on the request and/or store or retrieve data based on the request. A response may include providing a response message to the secure connection manager 228A that sends the response message back to load balancer 106A over back-end secure connection 240 such that the load balancer 106A forward the response message back to client 102 that made the request.

In some embodiments, a response may include the back-end process using the received metadata (e.g., a source address of the client) to send the response message directly to the client, without sending the message back over the back-end secure connection 240, for example.

Figure 5A:
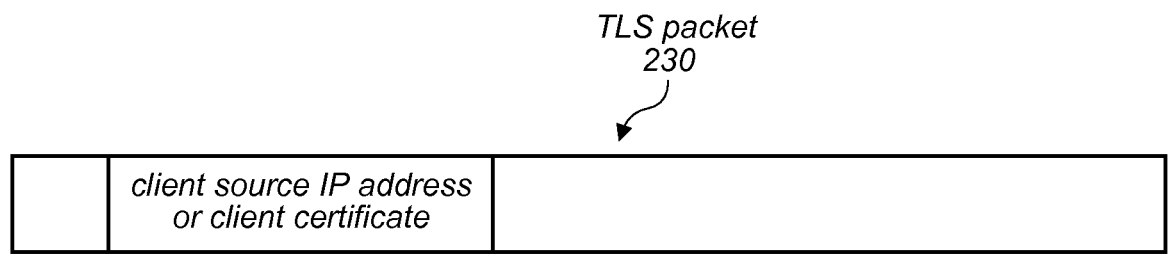
FIG. 5A illustrates an example transport layer security packet, according to at least some embodiments.
Figure 5B:
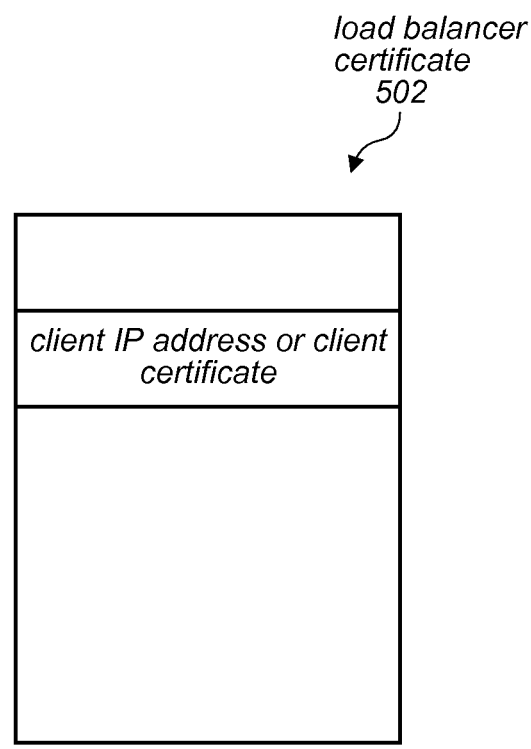
FIG. 5B illustrates an example load balancer certificate, according to at least some embodiments.

FIG. 5A illustrates an example transport layer security packet 230, that may be used to forward client metadata 234, in at least some embodiments. In the depicted embodiment, a client source IP address or a client certificate with the client IP address has been inserted into the packet as the client metadata 234 in accordance with the TLS protocol, although other types of security protocols (e.g., SSL, etc.) may be adhered to or implemented by the system. In various embodiments, an extension field defined by the security protocol may be used as a field in the packet header for inserting the client metadata. FIG. 5B illustrates an example load balancer certificate, according to at least some embodiments. In some embodiments, client metadata insertion module 218 may insert the client metadata into the load balancer certificate (not the client certificate). In the depicted embodiment, the client IP address or the client certificate is inserted into the load balancer certificate.

Response Time Back-Off

Figure 6:
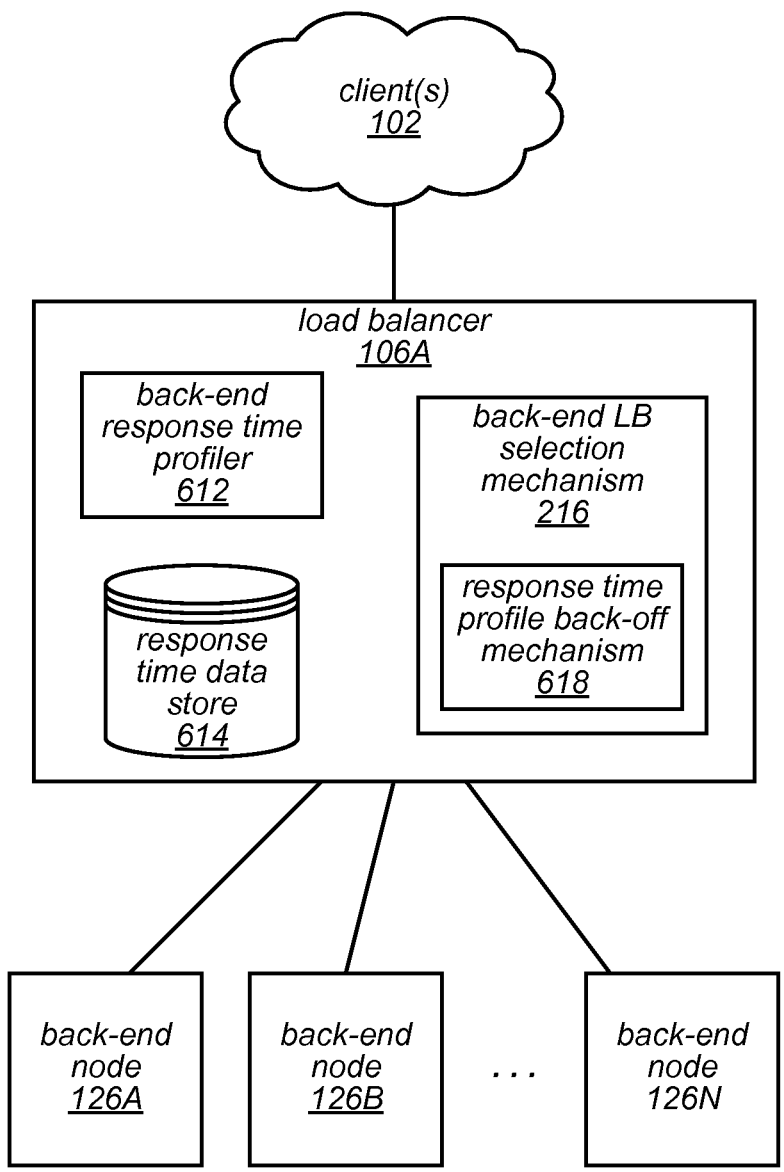
FIG. 6 illustrates an example system architecture of a load balancer and a fleet of back-end systems, according to at least some embodiments.

FIG. 6 illustrates example system architecture of a load balancer and a fleet of back-end nodes that respond to messages from more or more clients, according to at least some embodiments. The load balancer 106A is depicted with various components that implement a response time profile back-off mechanism that, in embodiments, simulates to a load balancer that a host is unavailable. Various ones of the components illustrated in FIG. 6 may perform one or more of the steps illustrated in FIG. 7, in embodiments.

Figure 7:
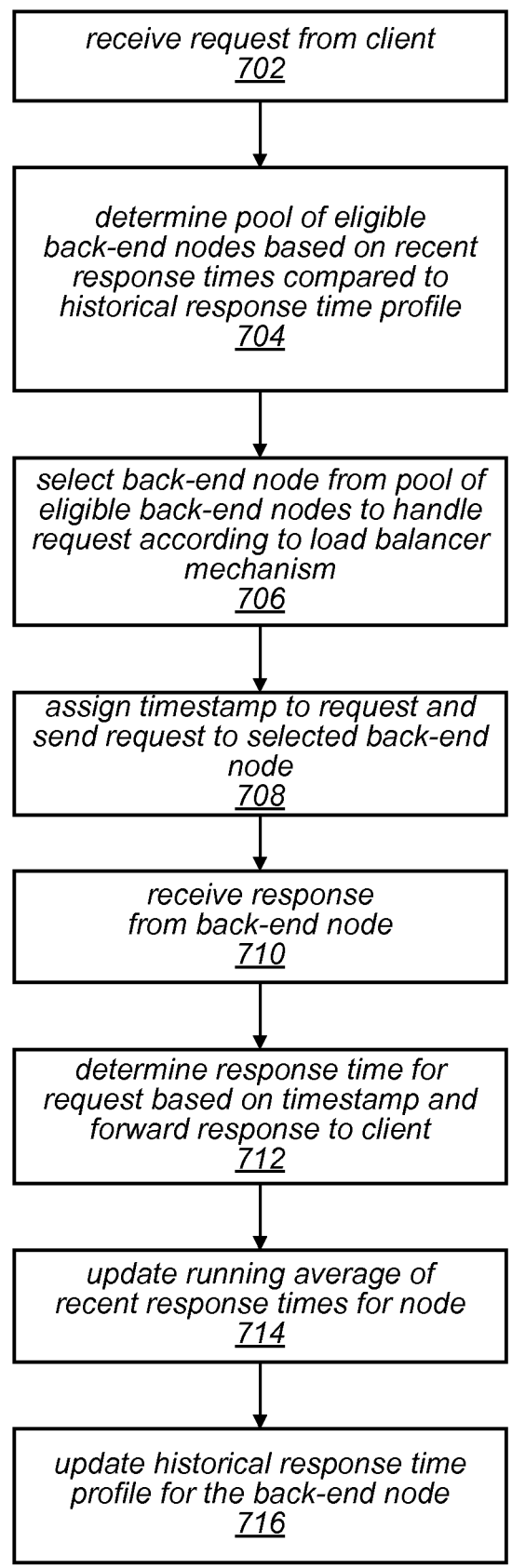
FIG. 7 is a flow diagram illustrating a node selection and information update process performed by a network device, in at least some embodiments.

FIG. 7 is a flow diagram illustrating a node selection and information update process performed by a network device, in at least some embodiments. In FIG. 7, it is assumed that initiation or priming of the system may have already happened. For example, in some embodiments, it may be necessary to perform the functionality described in block 710-718 in order to generate initial response times and a historical response time profiles described in blocks 704-708. In some embodiments, these values may be assigned defaults values at system startup and/or selection of the back-end nodes may initially be performed according to some technique (e.g., round robin) and then switch to using the selection process illustrated in FIG. 7.

For example, FIG. 7 illustrates that the request is received form a client. For example, a request may be received by load balancer 106A from client 102. In some embodiments, the request may be received over a connection similar to the client connection illustrated in FIG. 2, described above. At block 704, a pool of eligible back-end nodes may be determined based on recent response times compared to a historical response time profile (e.g., back-end nodes that have response times less than a minimum or short threshold may be excluded from the pool). For example, a back-end load balancer selection mechanism 216, or the response time profile back-off mechanism 618 may determine a pool of eligible nodes based on recent response times and historical response time profiles (e.g., recent times and profiles obtained from response time data store 614) for respective back-end nodes. In some embodiments, the recent response time and the historical response time profile may particular to each host, node or process. In some embodiments, the recent response time may be particular to the particular host or node, and the same historical response time profile may be associated with a group of hosts or nodes. For example, it may be known that a particular type of host or node has a particular response time profile and that known response time profile may be used as a default across a group of nodes of that type.

In some embodiments, instead of a pool, back-end nodes may be weighted according to response times (e.g., nodes with shorter times may be weighted so as to be more likely to be selected). For example, the response time profile back-off mechanism 618 may weight one or more of the back-end nodes (e.g., 126A-N) according to response times (e.g., response times stored in response time data store 614 or determined by back-end response time profiler 612). In embodiments, the back-end load balancer selection mechanism 216 or the response time profile back-off mechanism 618 may rely on signals or instructions from a service or system that is external to the load balancer. For example, the response time profile back-off mechanism may obtain metrics from a monitoring service or system. The metrics may be used to weight the one or more back-end nodes, or select the nodes for the pool, for example. In some embodiments a signal may be received by the load balancer from an external service or system and used to facilitate the back-off mechanism (e.g., the signal may indicate a back-end node should be removed from the pool or that requests to a back-end node should gradually be reduced).

A back-end node may be selected from the pool of eligible back-end nodes according to a load balancer mechanism (block 706). For instance, the back-end load balancer selection mechanism 216 may use any of various selection techniques (e.g., round robin or others) to select a back-end node from the pool. In some embodiments, the back-end load balancer selection mechanism may use the response time profile back-off mechanism described herein to select the back-end load balancer. For instance, the back-end load balancer selection mechanism 216 may generally apply a load balancer selection technique (e.g., round robin) to select a back-end node, but skip nodes based on that nodes recent response times compared to a historical response time profile (e.g., back-end nodes that have response times less than a minimum or short threshold may be skipped at this point). A combination of selection techniques may be used, in embodiments.

In embodiments, some back-end nodes may have a high probability of a timely response, it just may not be a desired response (e.g., Where a host is failing in early stage of processing requests and immediately returns application-level errors that may not be identifiable by load balancers. From the load balancer point of view, this host can be prioritized for receiving more requests. As a result of such request routing behavior change, there may be a spike in failed requests and increasing the impact of a host malfunction (a.k.a "a short circuit").

In embodiments, the load balancing mechanism is configured so that nodes having recent response time below a short response time threshold according to their respective profile will have a lower probability of being selected to handle requests. Such a mechanism may thereby avoid the above-noted short-circuit, in some embodiments.

The response time data may be obtained in a number of various ways. A timestamp may be attached to the request, the request sent to the selected back-end node (block 708) and a response received from the back-end node (710). For example, the back-end response time profiler 612 may assign a timestamp to the request before the request is sent to the selected back-end node and may obtain an indication of the time the response is received by the load balancer 106A from the back-end node (e.g., back-end node 126A).

A response time may be determined for the request based on the timestamp and the message forwarded to the requesting client (block 712). For example, the back-end response time profiler may obtain an indication of the time the response is received by the load balancer and compare it to the assigned timestamp to determine the response time, and the response time may be stored to the response time data store 614, as part of, or in order to generate, the historical response time profile for the back-end node that the response was received from. The load balancer 106A may forward the received response to a client (e.g., client 102).

Statistics may be developed by the back-end response time profiler 612 for a node based on a group of response times for that node. For instance, a running average of recent response times of a node may be updated based on the determined response time (block 714). The statistics may be stored in the response time data store 614. A historical response time profile may be updated for the back-end node (block 716). For instance, the back-end response time profiler 612 may update the profile based on the determined response time. Various statistical methods may be used to update or calculate the historical response time profile. For instance, a non-exhaustive list of statistical method may include excluding outliers, or using a mean instead of an average, etc.

Figure 8:
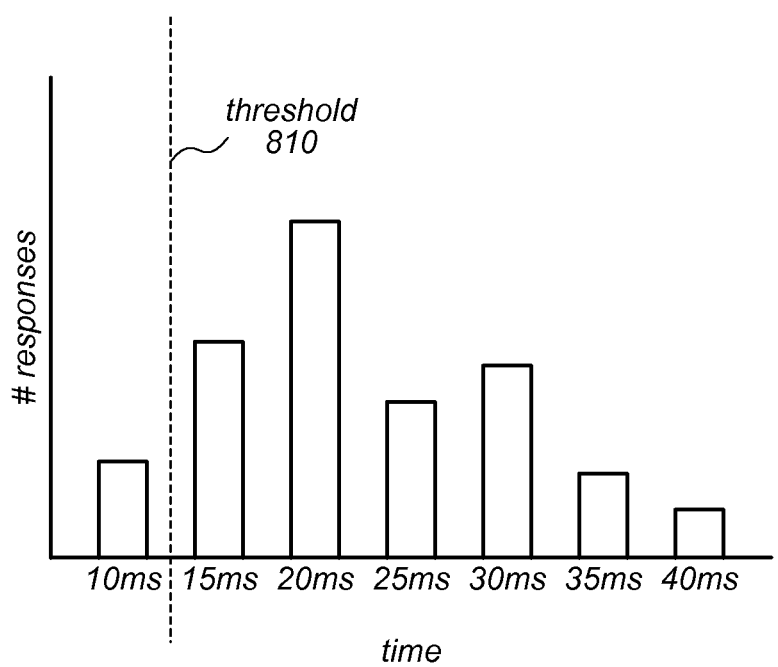
FIG. 8 is a bar chart illustrating a short threshold response time, according to at least some embodiments.

FIG. 8 is a bar chart illustrating a minimum or short threshold response time, according to at least some embodiments. The bar chart illustrates the historical number of responses that have been associated with various response times for a host node. Such statistics may be used to generate a response time profile for the host. For example, the response time profile may be set to a running average of recent response times for the host. The response time profile for the node may be determined by other types of calculations. For example, the calculations may exclude outliers or use a mean instead of an average, etc. The depicted threshold 810 may be a minimum threshold, in embodiments. The minimum threshold may be used to trigger a reduction in the number of messages or requests that are sent to the respective node, in embodiments. For example, load balancers may generally be configured to send more traffic to nodes that have faster response times than other nodes. However, sometimes a node may have a faster response time due to an inability to process requests. Setting a minimum threshold response time that is less than an expected response time for the node may prevent requests from being sent to a node that is unable to process them, in embodiments.

Figure 9A:
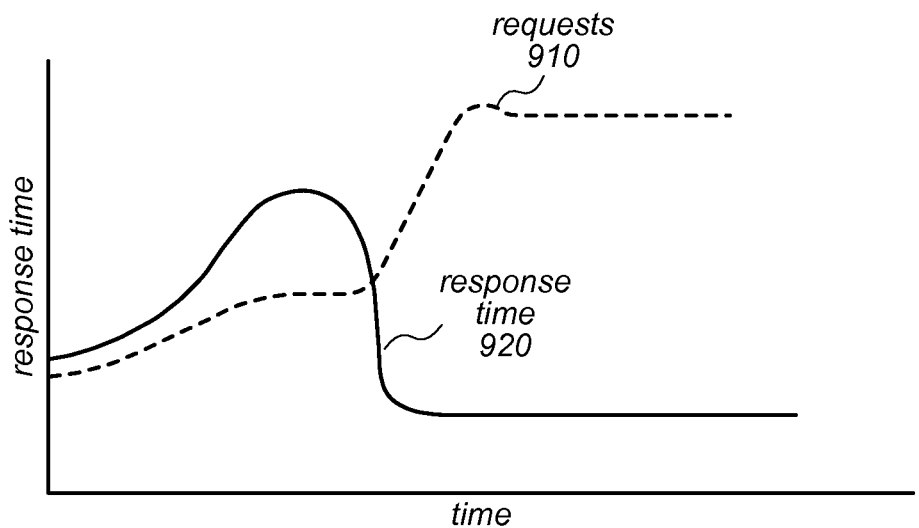
FIG. 9A is a line chart illustrating how response time responds to the number of requests, according to at least some embodiments.

FIG. 9A is a line chart illustrating how response time responds to the number of requests, according to at least some embodiments. FIG. 9A illustrates that for embodiments that do not incorporate a minimum threshold as part of the selection process, response times (e.g., 920) generally increase as with the number of requests (e.g., 910) over time to a point where response times may drop as requests continue to increase over time. For example, there are load balancing algorithms which route more requests to hosts that are responding faster than others. In some cases where one of hosts is failing in the early stage of processing requests, the host may immediately return application-level errors (e.g., errors not identifiable by load balancers). What may happen is that from the load balancer point of view, this host can be prioritized to receive more requests. As a result of such request routing behavior change, there may be a spike in failed requests (despite decreased response times) and an increasing impact of the host malfunction.

Figure 9B:
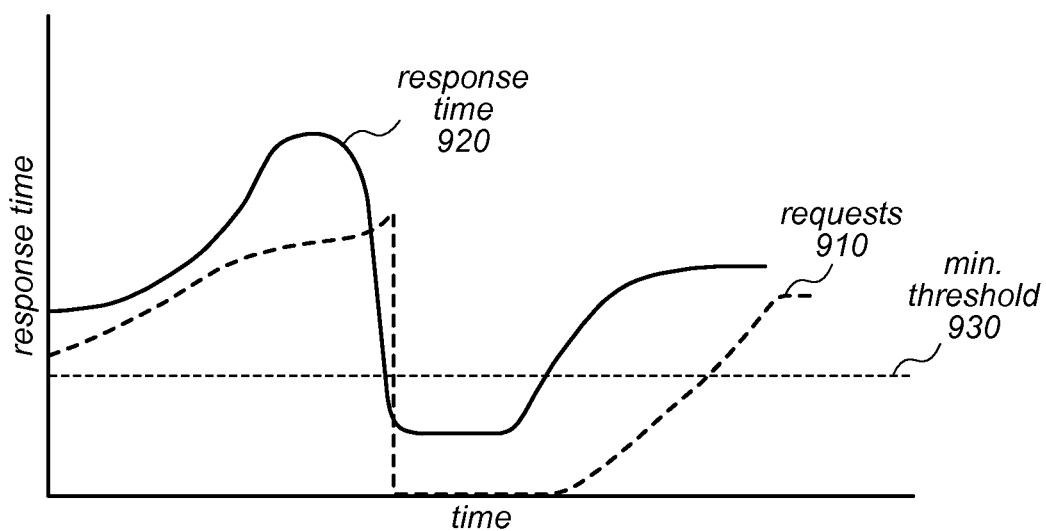
FIG. 9B is a line chart illustrating how response time responds to the number of requests when a minimum or short threshold is incorporated, according to at least some embodiments.

FIG. 9B is a line chart illustrating how response time 920 responds to the number of requests 910 when a minimum threshold 930 is incorporated, according to at least some embodiments. For example, a load balancing algorithm (e.g., an enhanced algorithm) may be configured to reduce the requests load to hosts which are responding to requests faster than expected or historically observed. To implement this mechanism the load balancer may keep a performance profile of hosts and compares that with the hosts' performance in a recent time window. The illustrated embodiment shows that, upon detecting response times shorter than expected from a host, the load balancer will reduce the load on the host. In some embodiments, the load may be reduced to a relatively low number of maintenance requests (e.g., requests that are used to observe the health of the node and bring the node back into the pool when the nodes health improves). In some embodiments, the request routing will go back to normal distribution after the host behaving according to its known performance profile.

Resource-Aware Load Balancing

Figure 10:
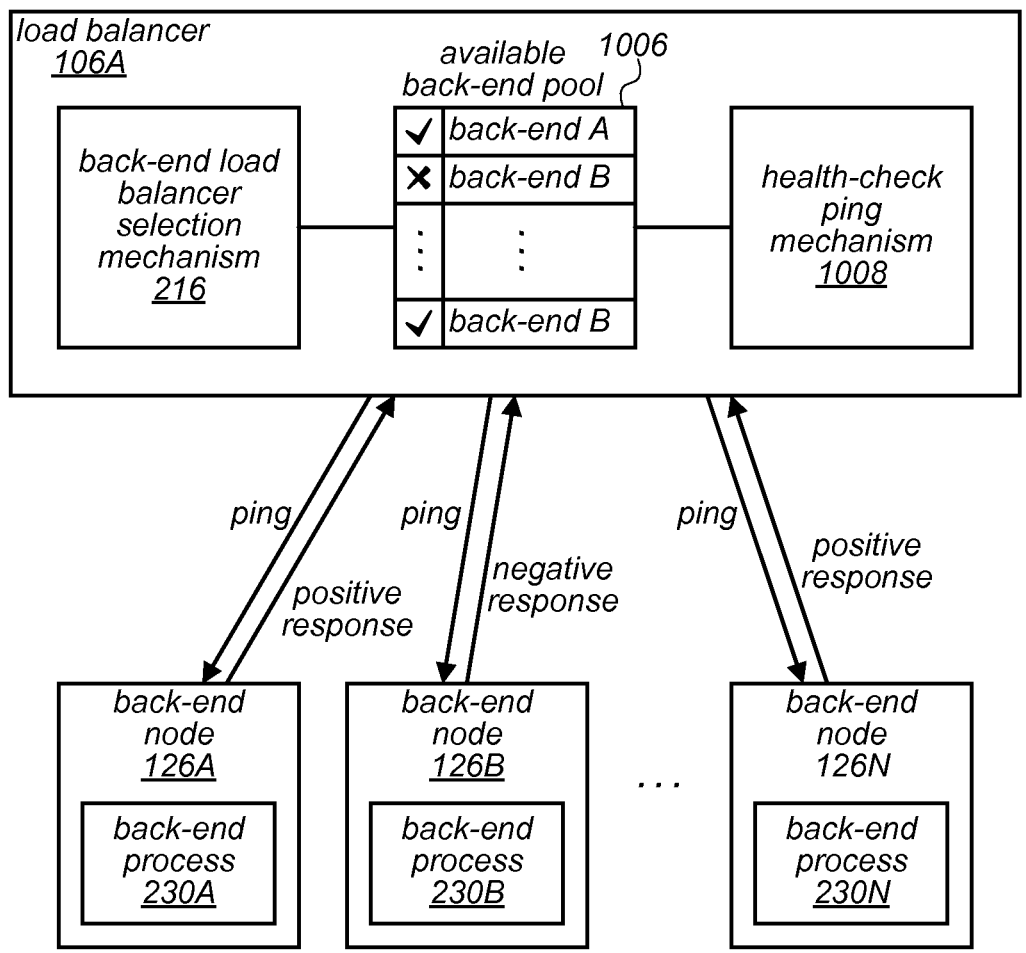
FIG. 10 is a block diagram illustrating an environment of a load balancer and a fleet of back-end processes that implement a ping health-check mechanism, in at least some embodiments.
Figure 11:
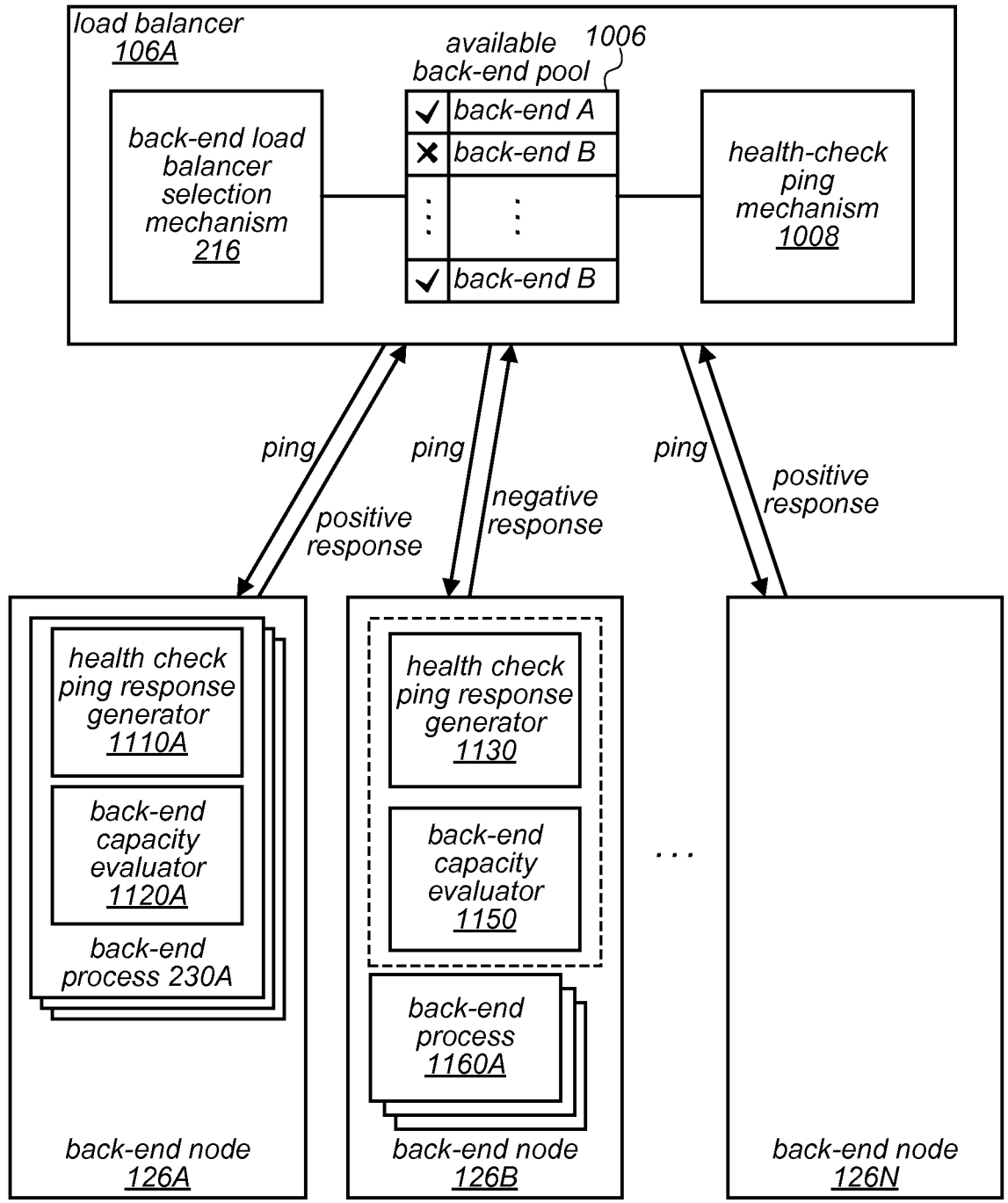
FIG. 11 is a block diagram illustrating an environment of a load balancer and a fleet of back-end processes that implement a ping health-check mechanism, in at least some embodiments.
Figure 12:
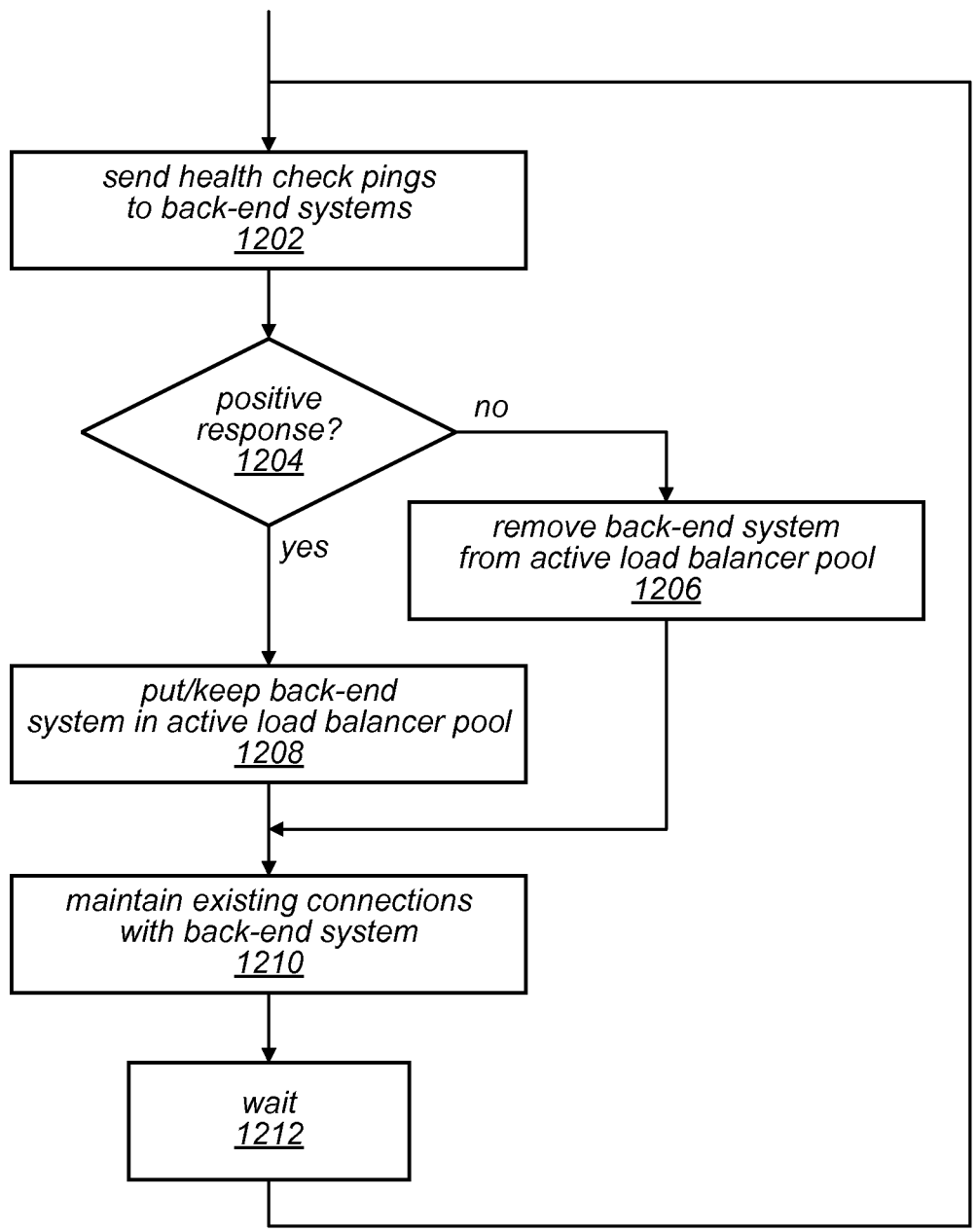
FIG. 12 is a flow diagram illustrating a load balancer process that uses health check pings as part of a load balancing mechanism, in at least some embodiments.
Figure 13:
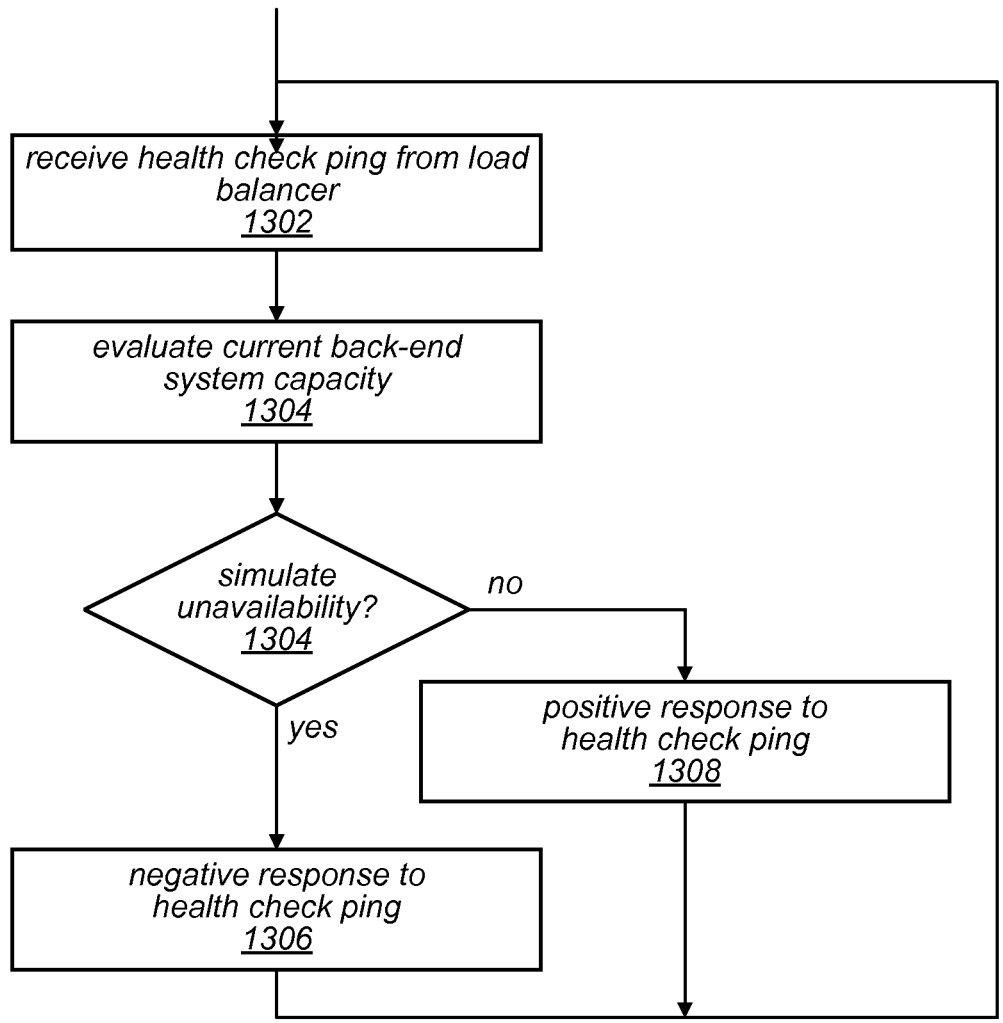
FIG. 13 is a flow diagram illustrating a process that responds to health check pings as part of a load balancing mechanism, in at least some embodiments.

FIG. 10 is a block diagram illustrating an environment of a load balancer and a fleet of back-end processes that implement a ping health-check mechanism, in at least some embodiments. FIG. 11 is a block diagram illustrating an alternative environment of a load balancer and a fleet of back-end processes that implement a ping health-check mechanism, in at least some embodiments. FIG. 12 is a flow diagram illustrating a load balancer process that uses health check pings as part of a load balancing mechanism, in at least some embodiments. FIG. 13 is a flow diagram illustrating a process that responds to health check pings as part of a load balancing mechanism, in at least some embodiments.

Generally, steps of the processes illustrated in FIGS. 12 and 13 may be implemented as computer-readable instructions in one or more of the components illustrated in FIGS. 10 and 11. For instance, the process illustrated in FIG. 12 may be performed by components of a load balancer and the process illustrated in FIG. 13, may be performed by a back-end system or node or host.

As explained above, using load balancers with only simple algorithms such as a round robin request distribution strategy may pose outage risk. For example, as more a more requests are sent to a host, the processing becomes slower than expected and therefore might cause timeouts on the client-side. These timeouts can simply translate to retry requests and browning out the hosts. This situation may happen as a result of load balancers only depending on simple health-checks or pings to decide if a host is ready to accept traffics.

Embodiment describe herein may implement resource-aware ping responses for network services behind the load balancers. In the implementation of service pings (e.g., http ping), the service may first measure its required resources (e.g., CPU, memory, hard disk, etc.) availability. If the measured amount of a resource falls below a configured threshold, it may emit a ping response to simulate that the host is unavailable (e.g., terminate the connection). Otherwise, it may emit a ping response which represents the host is available (e.g., return an HTTP 200 response). This configuration of the host may allow the host to flip its status (from the load balancer point of view) between available and unavailable when its required resources become scarce, for example.

In some embodiments, the resource-aware ping response described herein may be implemented on back-end nodes without making any changes, or by only making small changes, to the load balancer. For example, changes may be made only to the back-end nodes (and not to the load balancers) such that the back-end nodes simulate that the nodes are unavailable to the load balancer selection algorithm. In embodiments, the load balancer may already include basic logic that recognizes an unavailable hosts and stops distributing new requests to the host—but not more sophisticated logic that considers the available resources of the host and tailors a more gradual reduction in message distribution).

As illustrated in FIGS. 10, 11 and 12, health check pings may be sent to back-end systems (block 1202). For instance, health-check ping mechanism 1008 of load balancer 106A may send health check pings to any of the various back-end nodes 126A-N. As illustrated in FIG. 11, back-end node may be configured with components that are arranged in a number of different ways. For example, back-end nodes 126A of FIG. 11 is illustrated with a number of back-end processes 126A-N that each have a respective heath check ping response generator 1110A-N as well as a respective back-end capacity evaluator 1120A-N. In FIG. 11, back-end node 126B is illustrated with a single combined health check ping response generator 1130 and back-end capacity evaluator 1150 that evaluates and provides responses for a number of back-end processes 1160A-N.

As illustrated for back-end node 126A, each back-end process (e.g., 230A) is configured with a corresponding health check ping response generator (e.g., 1110A) that responds to health check pings in accordance with the health of the corresponding back-end process (e.g., 230A). Similarly, each back-end process is configured with a respective back-end capacity evaluator (e.g., 1120A) that evaluates the resources of the corresponding back-end process.

The health check ping response generator (e.g., 1110A) may receive the health check ping from the load balancer (block 1302), and the back-end capacity evaluator (e.g., 1120A) may evaluate the current back-end system capacity (block 1304). For example, the back-end capacity evaluator may measure and evaluate the CPU or memory or hard disk availability associated with the back-end process. If the measure amount of a resource falls below a threshold (e.g., a configurable or default or dynamic threshold) (block 1304, yes), the health check ping response generator may be configured to simulate unavailability of the corresponding back-end process (block 1306). Otherwise (block 1304, no), the health check ping response generator may be configured to emit a ping response with represents that the host is available (e.g., an HTTP 200 response) (block 1308).

When there is not a positive response, the back-end system may be removed from an active load balancer pool 1006 (block 1206). For instance, back-end load balancer selection mechanism 216 may obtain an indication of the response and remove the corresponding back-end system from the active load balancer pool for negative responses.

In at least some embodiments, a profile of a short-circuit (e.g., a sign of poor health based on characteristics such as, but not limited to, request response times for the back-end node, a historical response time profile, the number of open connections for the back-end node, the time of day, the type of request, a requestor id (e.g., a user name or fingerprint of the client certificate) or the origin of the request, etc.) may be generated. For example, various machine learning techniques may be applied to various criteria that describe characteristics of the system at or near-to the time of the short-circuit in order to generate a snapshot of the circumstances leading up to the short-circuit. Such characteristics captured in a snapshot may be used to predict another short-circuit. In embodiments, the characteristics may be used to increase a confidence level associated a likelihood of the short-circuit happening again. Pre-emptive measures (e.g., removing the node from the pool or gradually reducing the requests being sent to the node) may be taken based on comparing characteristics from the snapshot with current characteristics for an active node (e.g., a node in the pool, or a node with a likelihood of receiving requests). In some embodiments, such characteristics may be used to refine a threshold (e.g., min threshold 930).

In the illustrated embodiment, for positive responses (block 1204, yes), the back-end load balancer selection mechanism 216 of load balancer 106A may put or keep the back-end system in the active load balancer pool 1006 (block 1208). For example, the selection mechanism 216 may alter entries in a data store that track which back-end servers are in the available back-end pool 1006.

In either case, the load balancer 106A may be configured to maintain existing connections with the back-end systems (block 1210). For example, the health-check ping mechanism may continue to send health check pings to some or all of the back-end systems irrespective of whether some of the back-end systems are in the available back-end pool or not. In some embodiments, maintaining an existing connection may include maintaining the back-end secure connection 240 illustrated in FIG. 2. The system may be configured to wait for some period of time (block 1212) in-between sending health check pings to the back-end systems (block 1202).

Illustrative System

Figure 14:
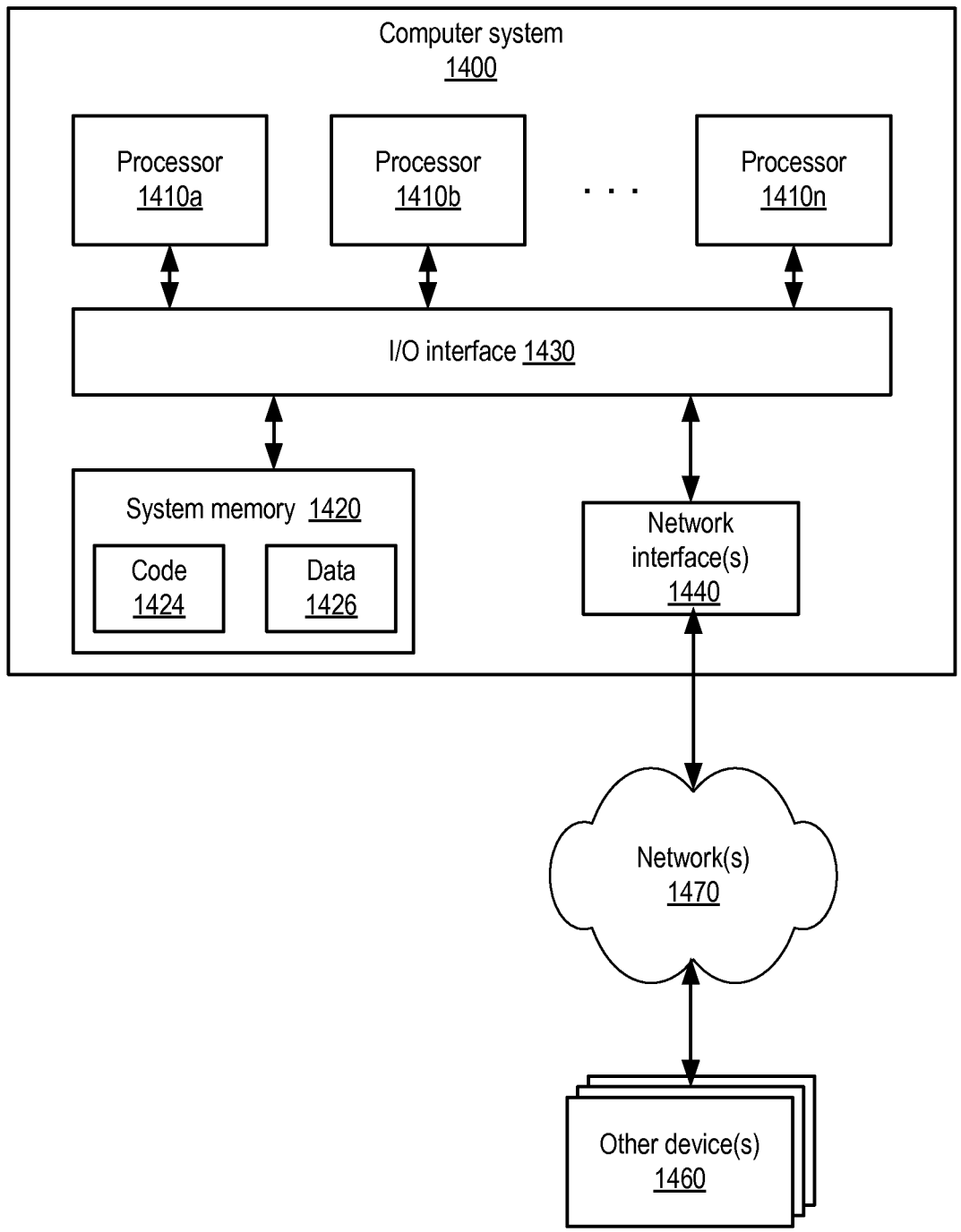
FIG. 14 is a block diagram illustrating an example computer system that may be used in some embodiments.

FIG. 14 is a block diagram illustrating an example computer system that may be used in some embodiments. In at least some embodiments, a server that implements a portion or all of the distributed load balancing methods and apparatus as described herein may include a general-purpose computer system that includes or is configured to access one or more computer-accessible media, such as computer system 1400 illustrated in FIG. 36. In the illustrated embodiment, computer system 1400 includes one or more processors 1410 coupled to a system memory 1420 via an input/output (I/O) interface 1430. Computer system 1400 further includes a network interface 1440 coupled to I/O interface 1430.

In various embodiments, computer system 1400 may be a uniprocessor system including one processor 1410, or a multiprocessor system including several processors 1410 (e.g., two, four, eight, or another suitable number). Processors 1410 may be any suitable processors capable of executing instructions. For example, in various embodiments, processors 1410 may be general-purpose or embedded processors implementing any of a variety of instruction set architectures (ISAs), such as the x86, PowerPC, SPARC, or MIPS ISAs, or any other suitable ISA. In multiprocessor systems, each of processors 1410 may commonly, but not necessarily, implement the same ISA.

System memory 1420 may be configured to store instructions and data accessible by processor(s) 1410. In various embodiments, system memory 1420 may be implemented using any suitable memory technology, such as static random access memory (SRAM), synchronous dynamic RAM (SDRAM), nonvolatile/Flash-type memory, or any other type of memory. In the illustrated embodiment, program instructions and data implementing one or more desired functions, such as those methods, techniques, and data described above for the distributed load balancing methods and apparatus, are shown stored within system memory 1420 as code 1424 and data 1426.

In one embodiment, I/O interface 1430 may be configured to coordinate I/O traffic between processor 1410, system memory 1420, and any peripheral devices in the device, including network interface 1440 or other peripheral interfaces. In some embodiments, I/O interface 1430 may perform any necessary protocol, timing or other data transformations to convert data signals from one component (e.g., system memory 1420) into a format suitable for use by another component (e.g., processor 1410). In some embodiments, I/O interface 1430 may include support for devices attached through various types of peripheral buses, such as a variant of the Peripheral Component Interconnect (PCI) bus standard or the Universal Serial Bus (USB) standard, for example. In some embodiments, the function of I/O interface 1430 may be split into two or more separate components, such as a north bridge and a south bridge, for example. Also, in some embodiments some or all of the functionality of I/O interface 1430, such as an interface to system memory 1420, may be incorporated directly into processor 1410.

Network interface 1440 may be configured to allow data to be exchanged between computer system 1400 and other devices 1460 attached to a network or networks 1450, such as other computer systems or devices as illustrated in FIGS. 1 through 35, for example. In various embodiments, network interface 1440 may support communication via any suitable wired or wireless general data networks, such as types of Ethernet network, for example. Additionally, network interface 1440 may support communication via telecommunications/telephony networks such as analog voice networks or digital fiber communications networks, via storage area networks such as Fibre Channel SANs, or via any other suitable type of network and/or protocol.

In some embodiments, system memory 1420 may be one embodiment of a computer-accessible medium configured to store program instructions and data as described above for FIGS. 1 through 13 for implementing embodiments of network devices such as a load balancing or back-end system. However, in other embodiments, program instructions and/or data may be received, sent or stored upon different types of computer-accessible media. Generally speaking, a computer-accessible medium may include non-transitory storage media or memory media such as magnetic or optical media, e.g., disk or DVD/CD coupled to computer system 1400 via I/O interface 1430. A non-transitory computer-accessible storage medium may also include any volatile or non-volatile media such as RAM (e.g. SDRAM, DDR SDRAM, RDRAM, SRAM, etc.), ROM, etc., that may be included in some embodiments of computer system 1400 as system memory 1420 or another type of memory. Further, a computer-accessible medium may include transmission media or signals such as electrical, electromagnetic, or digital signals, conveyed via a communication medium such as a network and/or a wireless link, such as may be implemented via network interface 1440.

Embodiments of the disclosure can be described in view of the following clauses:

Clause 1. A system, comprising:
a plurality of back-end processes implemented by a plurality of back-end servers; and
one or more load balancers coupled to the plurality of back-end servers, wherein individual ones of the one or more load balancers are configured to:
establish connections with clients;
receive requests from the clients via respective ones of the established connections;
establish secure connections to the respective back-end processes of the plurality of back-end processes according to a secure connection protocol;
apply a load balancing mechanism to select a respective back-end process of the plurality of back-end processes to handle respective ones of the received requests;
for a given one of the received requests, extract client metadata based on the given received request and generate a corresponding request for the one of the plurality of back-end processes selected according to the load balancing mechanism, wherein the corresponding request is generated according to the secure connection protocol and includes the client metadata in an extension field defined by the secure connection protocol; and
send, to the selected back-end process on a respective one of the established secure connections, the corresponding request including the client metadata in the extension field defined by the secure connection protocol.

Clause 2. The system of clause 1,
wherein the secure connection protocol is a transport layer security protocol; and
wherein the extension field used to send the client metadata is an extension field defined by the transport layer security protocol.

Clause 3. The system as recited in any of clauses 1-2, wherein the extracted client metadata is a source IP address that is extracted from the request.

Clause 4. The system as recited in any of clauses 1-3, wherein the selected back-end process is configured to:
receive the corresponding request including the client metadata in the extension field;
retrieve the client metadata from the extension field of the corresponding request; and
process the client metadata.

Clause 5. The system as recited in any of clauses 1-4, wherein to process the client metadata, the selected back-end process is further configured to:
process the client metadata as a security measure,
provide the client metadata to a logging process,
provide the client metadata to a tracking process,
provide the client metadata to a billing process associated with the client, or
process the client metadata to enforce a priority service level associated with the client.

Embodiments of the disclosure can also be described in view of the following clauses:

Clause 6. A process, comprising:
performing by one or more load balancers:
receiving a request from a client via a connection;
obtaining client metadata associated with the request;
establishing, according to a secure connection protocol, a secure connection to a back-end process, the back-end process selected from a plurality of back processes of a service provider according to a load balancing mechanism;
generating another request for the selected back-end process that corresponds to the received request and that is generated according to the secure connection protocol, and including the client metadata in a communication mechanism defined by the secure connection protocol; and
sending the corresponding request and the client metadata in the communication mechanism according to the secure connection protocol to the selected back-end process.

Clause 7. The process as recited in clause 6,
wherein the communication mechanism used for sending the client metadata includes an extension field of the corresponding request that is defined by the secure connection protocol; and
wherein said sending the corresponding request including the client metadata includes sending the corresponding request including the client metadata in the extension field of the corresponding request to the selected back-end process.

Clause 8. The process as recited in any of clauses 6-7,
wherein the communication mechanism used for sending the client metadata includes a certificate associated with the secure connection protocol; and
wherein said sending the corresponding request including the client metadata includes sending the certificate including the client metadata to the selected back-end process.

Clause 9. The process as recited in any of clauses 6-8, wherein the client metadata that is included in the corresponding request includes a source address that was extracted from the received request or data associated with a client certificate.

Clause 10. The process as recited in any of clauses 6-9, wherein the one or more load balancers are part of a provider network that provides network-based services to a plurality remote client networks.

Clause 11. The process as recited in any of clauses 6-10, further comprising:
receiving, by the selected back-end server, the corresponding request including the client metadata in the extension field;
performing said obtaining client metadata via extracting the client metadata from the extension field of the received request; and
processing the retrieved client metadata, processing including:
processing the client metadata as a security measure,
providing the client metadata to a logging process,
providing the client metadata to a tracking process,
providing the client metadata to a billing process associated with the client, or
processing the client metadata to enforce a priority service level associated with the client.

Clause 12. The process as recited in any of clauses 6-11, wherein said establishing the secure connection to the back-end process includes:
establishing the secure connection between a back-end secure connection manager of the one or more load balancers and a secure connection manager of a back-end device that implements the selected back-end process, wherein the secure connection manager of the back-end device manages secure connections for a plurality of distinct back-end processes.

Clause 13. The process as recited in any of clauses 6-12, wherein said establishing the secure connection to the back-end process comprises:
  establishing the secure connection to a secure connection manager associated with the selected back-end process by a back-end secure connection manager of the load balancer; and
wherein the process further comprises:
  receiving, by the secure connection manager, the corresponding request including the client metadata in the extension field;
  retrieving, by the secure connection manager, the client metadata from the extension field of the corresponding request; and
  providing, by the secure connection manager, the client metadata to the selected back-end process.

Clause 14. The process as recited in any of clauses 6-13, wherein the process further comprises applying the load balancing mechanism to select the back-end process of the plurality of back-end processes to handle the received request.

Embodiments of the disclosure can also be described in view of the following clauses:

Clause 15. A non-transitory computer readable medium that is executed by one or more processors to implement a load balancer configured to:
  receive a request from a client via the connection;
  obtain client metadata associated with the request;
  apply a load balancing mechanism to select a back-end process of the plurality of back-end processes to handle the request;
  establish, in accordance with a secure connection protocol, a secure connection to a back-end process, the back-end process selected according to a load balancing mechanism;
  generate a corresponding request for the selected back-end process that corresponds to the received request according to the secure connection protocol and include the client metadata in a communication mechanism defined by the secure connection protocol; and
  send the corresponding request and the client metadata in the communication mechanism according to the secure connection protocol to the selected back-end process.

Clause 16. The computer readable medium as recited in clause 15,
  wherein to generate the corresponding request according to the secure connection protocol, the load balancer is further configured to insert the client metadata in:
    an extension field of the corresponding request that is defined by the secure connection protocol, or
    a certificate associated with the secure connection protocol; and
  wherein to said send the corresponding request including the client metadata the load balancer is further configured to:
    send the corresponding request including the client metadata in the extension field of the corresponding request to the selected back-end process, or
    send the certificate including the client metadata to the selected back-end process.

Clause 17. The computer readable medium as recited in any of clauses 15-16,
  wherein the secure connection protocol is a transport layer security protocol;
  wherein the extension field or certificate used to send the client metadata is defined by the transport layer security protocol; and
  wherein the obtained client metadata is:
    a source IP address that is extracted from the received request, or
    a client certificate.

Clause 18. The computer readable medium as recited in any of clauses 15-17, wherein to establish the secure connection to the back-end process, the load balancer is further configured to:
  establish the secure connection between a back-end secure connection manager of the one or more load balancers and a secure connection manager of a back-end device that implements the selected back-end process, wherein the secure connection manager of the back-end device manages secure connections for a plurality of distinct back-end processes.

Clause 19. The computer readable medium as recited in any of clauses 15-18, wherein the client metadata that is sent in the communication mechanism is sent by the load balancer for use in a logging process, a tracking process, a billing process associated with the client, or to enforce a priority service level associated with the client, instead of for use as a security measure.

Clause 20. The computer readable medium as recited in any of clauses 15-19, wherein the load balancer is configured to implement said generate the corresponding request, said include the client metadata in the communications mechanism, and said send the corresponding request to the client without using magic numbers.

Embodiments of the disclosure can also be described in view of the following clauses:

Clause 21. A system, comprising:
  a fleet of back-end nodes implemented by a back-end system; and
  one or more load balancers configured to:
    determine a historical response time profile for individual back-end nodes of the fleet of back-end nodes;
    track recent response times for individual back-end nodes of the fleet of back-end nodes;
    determine a pool of eligible back-end nodes from the fleet of back-end nodes based at least in part on:
      a comparison of the respective recent response times for each back-end node compared to a short response time threshold for the back-end node, wherein the short response time threshold is based on the respective historical response time profile for the back-end node; and
      wherein back-end nodes having recent response times below the respective short response time thresholds are excluded from the pool of eligible back-end nodes;
    for a request received by the one or more load balancers from a client:
      select, from the pool of eligible back-end nodes and in accordance with a load balancing mechanism, a back-end node to handle the request;
      send the request to the selected back-end node;
      receive a response to the request; and
      forward the response to the client.

Clause 22. The system of clause 21, wherein to determine the historical response time profile for individual back-end nodes of the fleet of back-end nodes, the one or more load balancers are further configured to:
  for a plurality of requests received by the one or more load balancers:
    select respective back-end nodes to handle the requests according to a load balancing mechanism;
    assign respective timestamps to the respective requests;

send the requests to the selected back-end nodes;
receive respective responses from the selected back-end nodes;
determine response times for the respective responses, and forward the respective responses to respective clients; and
update a running average of recent response times for respective back-end nodes.

Clause 23. The system of any of clauses 21-22, wherein the one or more load balancers are further configured to update the respective historical response time profile for respective back-end nodes based at least in part on the respective updated running average.

Clause 24. The system of any of clauses 21-23, wherein the one or more load balancers are further configured to:
continue to track response times for back-end nodes that are excluded from the pool of eligible back-end nodes; and
include an excluded back-end node in the pool of eligible back-end nodes when the excluded back-end node exhibits response times above the respective short response time threshold.

Embodiments of the disclosure can also be described in view of the following clauses:

Clause 25. A process, comprising:
performing by one or more load balancers:
determining a pool of eligible back-end nodes from a fleet of back-end nodes based at least in part on:
comparing respective recent response times for each back-end node of the fleet of back-end nodes compared to a short response time threshold for the respective back-end node, wherein the short response time threshold is based at least in part on one or more characteristics of the back-end node; and
excluding back-end nodes having recent response times below the respective short response time thresholds from the pool of eligible back-end nodes;
for requests received by the one or more load balancers from one or more clients:
selecting, from the pool of eligible back-end nodes and in accordance with a load balancing mechanism, respective back-end nodes to handle the requests; and
sending the requests to the respective selected back-end nodes.

Clause 26. The process recited in clause 25, further comprising:
assigning a timestamp to a request and sending the request to a given back-end node;
receiving a response from the given back-end node;
determining a response time for the request based at least in part on the timestamp; and
storing the determined response time to a data store.

Clause 27. The process recited in clause 26, further comprising updating a running average of recent response times for the given back-end node based at least in part on the determined response time.

Clause 28. The process recited in clause 27, wherein the short response time threshold is based at least in part on a historical response time profile for the given back-end node, the process further comprising updating the historical response time profile for the given back-end node based at least in part on the running average of recent response times.

Clause 29. The process recited in clause 28, wherein the updated historical response time profile for the given back-end node is used to determine eligibility of the given back-end node for the pool of eligible back-end nodes.

Clause 30. The process recited in any of clauses 25-29, the process further comprising:
receiving respective responses to the requests; and
forwarding the respective responses to the respective clients.

Clause 31. The process as recited in any of clauses 25-30, wherein the short response time threshold is based at least in part on a historical response time profile for the given back-end node, and wherein the historical response time profiles for individual back-end nodes of the fleet of back-end nodes are set to known response times for a particular type of back-end node.

Clause 32. The process recited in any of clauses 25-31, wherein subsequent to said determining the pool of eligible back-end nodes from the fleet of back-end nodes based on said comparing, said selecting respective back-end nodes in accordance with the load balancing mechanism includes routing more requests to back-end nodes of the pool with shorter recent response times than to back-end nodes of the pool with longer recent response times.

Embodiments of the disclosure can also be described in view of the following clauses:

Clause 33. A non-transitory computer-readable medium storing program instructions that are executed by one or more processors to implement a load balancer configured to:
in response to a request, select a back-end node from a fleet of back-end nodes to service the request based at least in part on:
a historical response time profile; and
a current response time;
wherein a load balancer mechanism for selecting the back-end node specifies that a back-end node with a current response time less than a short response time threshold has a lower probability of selection than a back-end node with a current response time greater than the short response time threshold.

Clause 34. The non-transitory computer-readable medium of clause 33, wherein the load balancer is further configured to:
determine the respective historical response time profiles for the back-end nodes, wherein determine includes:
assign a timestamp to a request and send the request to a given back-end node;
receive a response from the given back-end node;
determine a response time for the received request based at least in part on the timestamp; and
update a running average of recent response times for the given back-end node.

Clause 35. The non-transitory computer-readable medium of clause 34, wherein the load balancer is further configured to update the respective historical response time profile for the given back-end node based at least in part on the updated running average.

Clause 36. The non-transitory computer-readable medium of any of clauses 33-35, wherein to specify that the back-end node with the current response time less than the short response time threshold is assigned the lower probability of selection than the back-end node with the current response time greater than the short response time threshold, the load balancer is configured to weight back-end nodes according to response times, and wherein nodes with shorter times are weighted so as to be more likely to be selected.

Clause 37. The non-transitory computer-readable medium of any of clauses 33-36, wherein the load balancer is further configured to:

continue to track response times for back-end nodes with current response times less than a short response time threshold; and increase the probability of selection for a particular back-end node of the back-end nodes with current response times less than a short response time threshold when the particular back-end node exhibits improved health.

Clause 38. The non-transitory computer-readable medium of any of clauses 33-37, wherein the load balancer is further configured to route more requests to back-end nodes with relatively shorter recent response times than to back-end nodes with relatively longer recent response times.

Clause 39. The non-transitory computer readable medium of clause 33-38, wherein to perform said select respective back-end nodes to handle the requests, the load balancer is further configured use responses to TCP or HTTP pings to identify back-end nodes that are unable to process requests.

Clause 40. The non-transitory computer readable medium of any of clauses 33-39, wherein the respective historical response time profile for the back-end node includes a number of open connections for the back-end node, a time of day, a type of request, a requestor id, or an origin of a request; and wherein the short response time threshold is based at least in part on the number of open connections for the back-end node, the time of day, the type of request, a requestor id, or the origin of the request.

CONCLUSION

Various embodiments may further include receiving, sending or storing instructions and/or data implemented in accordance with the foregoing description upon a computer-accessible medium. Generally speaking, a computer-accessible medium may include storage media or memory media such as magnetic or optical media, e.g., disk or DVD/CD-ROM, volatile or non-volatile media such as RAM (e.g. SDRAM, DDR, RDRAM, SRAM, etc.), ROM, etc., as well as transmission media or signals such as electrical, electromagnetic, or digital signals, conveyed via a communication medium such as network and/or a wireless link.

The various methods as illustrated in the figures and described herein represent exemplary embodiments of methods. The methods may be implemented in software (e.g., computer-readable program instructions), hardware, or a combination thereof. The order of method may be changed, and various elements may be added, reordered, combined, omitted, modified, etc.

Various modifications and changes may be made as would be obvious to a person skilled in the art having the benefit of this disclosure. It is intended to embrace all such modifications and changes and, accordingly, the above description to be regarded in an illustrative rather than a restrictive sense.

What is claimed is:

1. A system, comprising:
a plurality of back-end processes implemented by a plurality of back-end servers; and
one or more load balancers coupled to the plurality of back-end servers, wherein individual ones of the one or more load balancers are configured to:
establish connections with clients;
receive requests from the clients via respective ones of the established connections;
establish secure connections to the respective back-end processes of the plurality of back-end processes according to a secure connection protocol;
apply a load balancing mechanism to select a respective back-end process of the plurality of back-end processes to handle respective ones of the received requests;
for a given one of the requests received via the established connections,
extract client metadata, comprising a source address of the respective client, based on the given received request,
generate a corresponding request for the one of the plurality of back-end processes selected according to the load balancing mechanism, wherein the corresponding request is generated according to the secure connection protocol, and
include the client metadata in a load balancer certificate defined by the secure connection protocol; and
send, to the selected back-end process on a respective one of the established secure connections,
the corresponding request, and
the extracted client metadata comprising the source address of the respective client in the load balancer certificate.

2. The system of claim 1,
wherein the secure connection protocol is a transport layer security protocol; and
wherein the certificate used to send the client metadata is a certificate defined by the transport layer security protocol.

3. The system of claim 1, wherein the extracted client metadata is a source IP address that is extracted from the request.

4. The system of claim 1, wherein the selected back-end process is configured to:
receive the corresponding request including the client metadata in the certificate;
retrieve the client metadata from the certificate of the corresponding request; and
process the client metadata.

5. The system of claim 4, wherein to process the client metadata, the selected back-end process is further configured to:
process the client metadata as a security measure,
provide the client metadata to a logging process,
provide the client metadata to a tracking process,
provide the client metadata to a billing process associated with the client, or process the client metadata to enforce a priority service level associated with the client.

6. A process, comprising:
performing by one or more load balancers:
receiving a request from a client via a connection;
obtaining, based on the request, client metadata associated with the request, the client metadata comprising a source address of the client;
establishing, according to a secure connection protocol, a secure connection to a back-end process, the back-end process selected from a plurality of back-end processes of a service provider according to a load balancing mechanism;
generating another request for the selected back-end process that corresponds to the request received via the connection, the other request generated according to the secure connection protocol;
including the client metadata, comprising the source address of the client, in a load balancer certificate defined by the secure connection protocol; and sending the corresponding request and the client metadata comprising the source address of the client in the load balancer certificate to the selected back-end process.

7. The process as recited in claim 6, wherein the client metadata includes a source address that was extracted from the received request or data associated with a client certificate.

8. The process as recited in claim 6, wherein the one or more load balancers are part of a provider network that provides network-based services to a plurality of remote client networks.

9. The process as recited in claim 6, further comprising:
receiving, by the selected back-end process, the corresponding request including the client metadata in the certificate;
performing said obtaining client metadata via extracting the client metadata from the certificate of the received request; and
processing the retrieved client metadata, processing including:
processing the client metadata as a security measure, providing the client metadata to a logging process, providing the client metadata to a tracking process, providing the client metadata to a billing process associated with the client, or
processing the client metadata to enforce a priority service level associated with the client.

10. The process as recited in claim 6, wherein said establishing the secure connection to the back-end process includes:
establishing the secure connection between a back-end secure connection manager of the one or more load balancers and a secure connection manager of a back-end device that implements the selected back-end process, wherein the secure connection manager of the back-end device manages secure connections for a plurality of distinct back-end processes.

11. The process as recited in claim 6,
wherein said establishing the secure connection to the back-end process comprises:
establishing the secure connection to a secure connection manager associated with the selected back-end process by a back-end secure connection manager of the load balancer; and
wherein the process further comprises:
receiving, by the secure connection manager, the corresponding request including the client metadata in the certificate;
retrieving, by the secure connection manager, the client metadata from the certificate of the corresponding request; and
providing, by the secure connection manager, the client metadata to the selected back-end process.

12. The process as recited in claim 6, wherein the process further comprises applying the load balancing mechanism to select the back-end process of the plurality of back-end processes to handle the received request.

13. A non-transitory computer readable medium storing program instructions that when executed by one or more processors implement a load balancer configured to:
receive a request from a client via a connection;
obtain, based on the request, client metadata associated with the request, the client metadata comprising a source address of the client;
apply a load balancing mechanism to select a back-end process of a plurality of back-end processes to handle the request;
establish, in accordance with a secure connection protocol, a secure connection to a back-end process, the back-end process selected according to the load balancing mechanism;
generate a corresponding request for the selected back-end process that corresponds to the request received via the connection, the corresponding request generated according to the secure connection protocol;
including the client metadata, comprising the source address of the client, in a load balancer certificate defined by the secure connection protocol; and
send the corresponding request and the client metadata comprising the source address of the client in the load balancer certificate to the selected back-end process.

14. The computer readable medium as recited in claim 13, wherein the secure connection protocol is a transport layer security protocol;
wherein the certificate used to send the client metadata is defined by the transport layer security protocol; and
wherein the obtained client metadata is:
a source IP address that is extracted from the received request, or
a client certificate.

15. The computer readable medium as recited in claim 13, wherein to establish the secure connection to the back-end process, the load balancer is further configured to:
establish the secure connection between a back-end secure connection manager of the one or more load balancers and a secure connection manager of a back-end device that implements the selected back-end process, wherein the secure connection manager of the back-end device manages secure connections for a plurality of distinct back-end processes.

16. The computer readable medium as recited claim 13, wherein the client metadata that is sent in the certificate is sent by the load balancer for use in a logging process, a tracking process, a billing process associated with the client, or to enforce a priority service level associated with the client, instead of for use as a security measure.

17. The computer readable medium as recited claim 13, wherein the load balancer is configured to implement said generate the corresponding request, said include the client metadata in the certificate, and said send the corresponding request to the client without using magic numbers.

* * * * *